United States Patent
Yost (10) Patent No.: US 10,635,629 B2
(45) Date of Patent: Apr. 28, 2020

(54) INTER-INTEGRATED CIRCUIT (I2C) BUS EXTENDER

(71) Applicant: Lockheed Martin Corporation, Bethesda, MD (US)

(72) Inventor: Boris Yost, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 539 days.

(21) Appl. No.: 14/964,553

(22) Filed: Dec. 9, 2015

(65) Prior Publication Data

US 2017/0168976 A1 Jun. 15, 2017

(51) Int. Cl.
*G06F 13/20* (2006.01)
*G06F 13/42* (2006.01)
*G06F 13/40* (2006.01)

(52) U.S. Cl.
CPC ...... *G06F 13/4282* (2013.01); *G06F 13/4004* (2013.01); *G06F 13/4045* (2013.01)

(58) Field of Classification Search
None
See application file for complete search history.

(56) References Cited

U.S. PATENT DOCUMENTS

| | | | | |
|---|---|---|---|---|
| 5,231,273 A * | 7/1993 | Caswell | ............... | G06K 7/0008 235/385 |
| 6,362,654 B1 | 3/2002 | Anderson et al. | | |
| 6,522,169 B2 | 2/2003 | Anderson et al. | | |
| 7,236,018 B1 * | 6/2007 | Wang | .................... | H03F 1/0205 326/83 |
| 7,408,993 B2 | 8/2008 | Webster | | |
| 7,793,022 B2 | 9/2010 | Travers et al. | | |
| 2006/0129370 A1 | 7/2006 | Unger | | |
| 2012/0054389 A1 | 3/2012 | Lee | | |

FOREIGN PATENT DOCUMENTS

| | | | | |
|---|---|---|---|---|
| EP | 0977126 A3 | 2/2000 | | |
| EP | 2555125 A1 | 2/2013 | | |
| SE | 0759593 A2 * | 2/1997 | ......... | G06F 13/4072 |
| WO | WO 02/15013 A2 | 2/2002 | | |
| WO | WO 03/079623 A1 | 9/2003 | | |

OTHER PUBLICATIONS

Wikipedia.com, Ohm's law, Jun. 14, 2006, pp. 1-8.*
International Search Report and Written Opinion for Application No. PCT/US2016/065723 dated Apr. 4, 2017.

* cited by examiner

*Primary Examiner* — Steven G Snyder
*Assistant Examiner* — Dean Phan
(74) *Attorney, Agent, or Firm* — Wolf, Greenfield & Sacks, P.C.

(57) ABSTRACT

According to some aspects, a network interoperability device is provided, comprising a first interface configured to electrically couple to one or more inter-integrated circuit (I2C) devices via an I2C bus, a second interface configured to electrically couple to a data input port and a distinct data output port of a non-I2C transceiver, and a control circuit electrically coupled to the first and second interfaces and configured to control communication of an I2C frame between the I2C bus and the non-I2C transceiver.

16 Claims, 5 Drawing Sheets

| Non-I2C Input | I2C Bus | Non-I2C Output |
|---|---|---|
| High | High | High |
| High | Low | Low |
| Low | Low | High |

INTER-INTEGRATED CIRCUIT (I2C) BUS EXTENDER

BACKGROUND

The techniques described herein relate generally to communication techniques that utilize bus technologies other than Inter-Integrated Circuit (I2C) to facilitate communication between electronic devices configured to communicate via I2C.

Inter-Integrated Circuit (I2C) is a popular serial bus technology frequently used to connect peripheral devices to processors and microcontrollers. For instance, an I2C bus may be deployed in personal computer motherboards, in embedded systems or in cellular telephones. Typically, an I2C bus is used to communicate between devices over short distances where the devices are attached to the same circuit board and share a common power supply.

SUMMARY

According to some aspects, a network interoperability device is provided comprising a first interface configured to electrically couple to one or more inter-integrated circuit (I2C) devices via an I2C bus, a second interface configured to electrically couple to a data input port and a distinct data output port of a non-I2C transceiver, and a control circuit electrically coupled to the first and second interfaces and configured to control communication of an I2C frame between the I2C bus and the non-I2C transceiver.

According to some aspects, a network interoperability circuit is provided comprising a voltage comparator having a first input terminal and a second input terminal, one or more first resistive components coupling the first input terminal to a first reference potential, one or more second resistive components coupling the first input terminal to the second input terminal, one or more third resistive components coupling the second input terminal to the first reference potential, and one or more fourth resistive components coupling the second input terminal to a second reference potential.

According to some aspects, a communication network is provided comprising one or more inter-integrated circuit (I2C) devices, an I2C bus coupling the one or more I2C devices, a non-I2C transceiver, and a network interoperability device, including a first interface electrically coupled to the I2C bus, a second interface electrically coupled to the non-I2C transceiver, and a control circuit electrically coupled to the first and second interfaces and configured to control communication of an I2C frame between the I2C bus and the non-I2C transceiver.

The foregoing is provided by way of illustration and is not intended to be limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
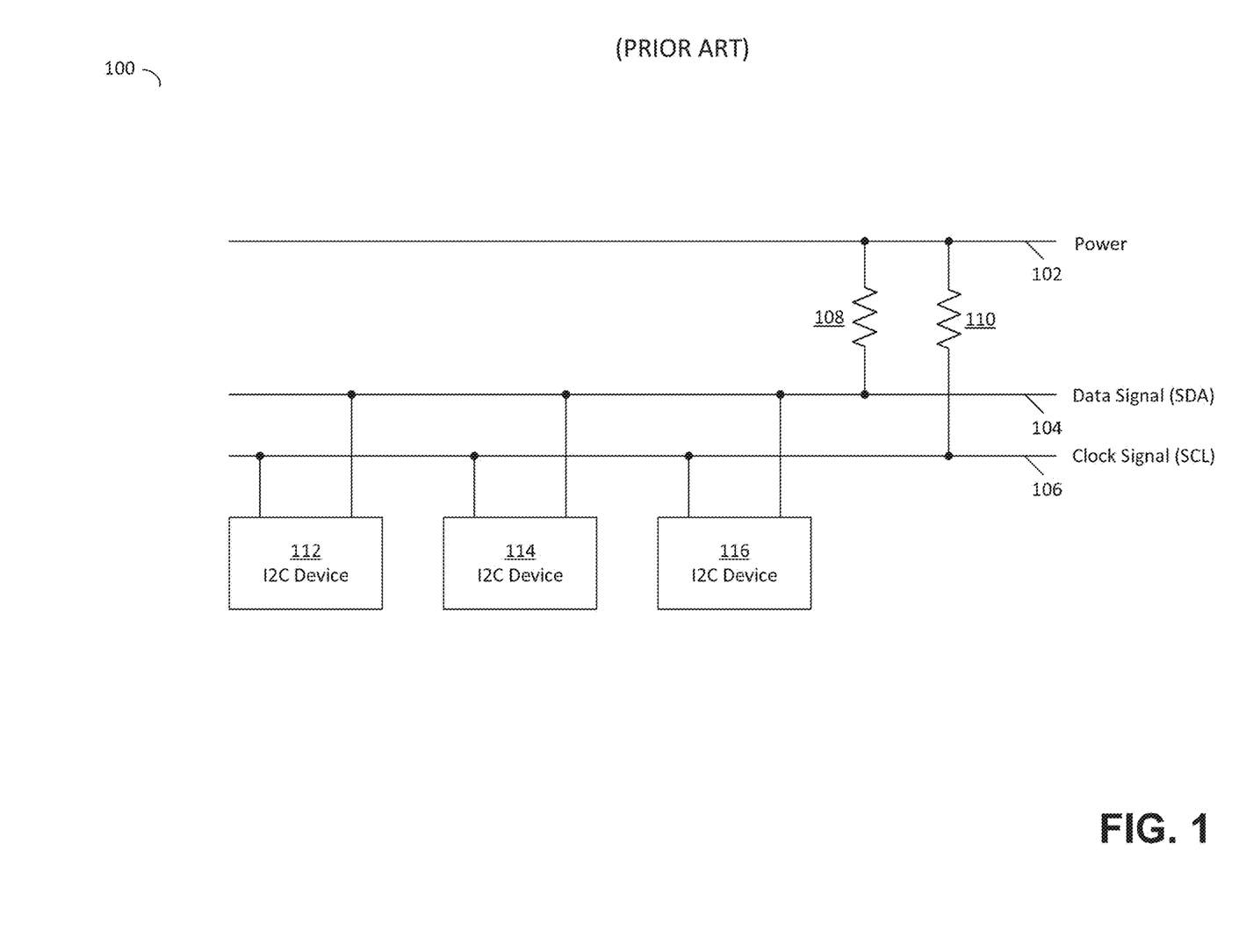
FIG. 1 depicts a block diagram of an illustrative I2C bus system.

An I2C bus consists of two signals: a clock signal and a data signal. A device utilizing an I2C bus connects to the bus via an I2C transceiver, which can drive a selected signal line to a low voltage state. Each signal line is coupled to a pull-up resistor to restore the signal to a high voltage state when no device is driving a low voltage state. FIG. 1 depicts a block diagram of the physical layer of an illustrative I2C bus system 100 in which three I2C devices 112, 114 and 116 are coupled to I2C data signal line 104 and I2C clock signal line 106. Pull-up resistors 108 and 110 couple the data and clock signal lines to a power supply line 102.

The idle state in an I2C bus is a high voltage state (corresponding to a digital "1"). To transmit a low voltage state from an I2C device (corresponding to a digital "0"), an I2C device (such as I2C device 112, 114 or 116) drives a signal line to the low state. Each of the other I2C transceivers connected to that signal line then receive the signal transmitted by the low state. Transmission of data along an I2C bus line is thereby transmitted to all connected devices at the same time.

Typically, one device connected to an I2C bus is configured to be a "master" device and transmits data to other devices connected on the bus being configured as "slave" devices. Where multiple master devices are used with a single I2C bus, the two master devices must take turns in using the bus to communicate. An I2C message may be an address frame, in which a master device indicates a slave device to which a message is being sent, or may be a data frame which are typically 8-*bit* data messages passed from master to slave or vice versa.

Since I2C is a popular bus technology, when developing a system utilizing I2C it may be cost-effective and/or mechanically simpler to build the system by utilizing off-the-shelf I2C devices. However, the system being developed may also be designed to locate two such I2C devices in distinct physical locations, resulting in the device being connected via a cable that has a longer length than typical use cases for which the I2C bus was designed. Moreover, the utilized I2C devices may also have different power supplies.

Use of a longer cable and/or different power supplies may lead to the following problems. Since transmitting a digital "0" on an I2C bus involves driving a signal line from a high voltage state to a low voltage state, this results in a high impedance at the leading edge of a signal, which can make it difficult to drive a longer cable. Furthermore, since a common ground is typically extended between devices connected to an I2C bus, use of separate power supplies can make the I2C bus susceptible to common mode noise. While drivers have been developed that allow an I2C signal to be driven through longer cables (e.g., transient pulse drivers used to drive the "Plug'n'Play" channel in a Digital Video Interface (DVI) cable), such solutions do not address the common mode noises issues.

The inventors have recognized and appreciated that since an I2C bus may experience significant noise levels in addition to a high impedance, it would accordingly be beneficial to configure an I2C device in such a way as to address both noise and impedance issues within the I2C bus. In particular, lightweight systems such as Unmanned Aerial Vehicles (UAVs) may utilize multiple devices equipped with I2C transceivers yet the I2C bus on which these devices communicate may experience significant noise and interference due to electromagnetic fields generated within the device (e.g., by motors) and/or from external sources. In addition, such systems may connect I2C devices via cables or wires that, due to the issues discussed above, may have a high impedance. As such, it may be desirable to couple devices equipped with I2C transceivers (hereafter referred to simply as "I2C devices") to one another in such a way as to address the noise and impedance issues within an I2C bus. Moreover, for applications in which there are size and/or weight constraints, such as in a UAV, it may further be desirable to address these issues in a lightweight manner.

The inventors have developed a network interoperability device for coupling I2C devices to one another through a non-I2C bus in a manner that is transparent to the I2C devices. By coupling the I2C devices together using a non-I2C bus that is not susceptible to the above-described issues, the I2C devices may communicate via their I2C transceivers without modification. Moreover, the non-I2C bus technology may also be used without modification as the network interoperability device described herein effectively converts from one bus standard to another (from I2C to non-I2C, and vice versa) in a manner transparent to both the I2C devices and the non-I2C bus.

As described herein, use of a non-I2C bus to transmit I2C frames refers primarily to the use of the physical layer of a non-I2C bus technology. If the physical layer of a non-I2C bus is chosen that is not susceptible to the impedance and/or noise issues described above, I2C frames may be transmitted through this physical layer to mitigate or resolve these issues. The frames transmitted through the non-I2C bus may remain I2C frames in terms of the data that they contain. While the non-I2C bus may utilize a physical layer that differs from that of an I2C bus, the non-I2C bus may transmit high and low values (that correspond to "bits" of data) that match values transmitted by an I2C device.

According to some embodiments, a network interoperability device may be configured to receive I2C frames (e.g., address frames and/or data frames) from one or more I2C devices via an I2C bus, and transmit those I2C frames over a non-I2C bus. The network interoperability device may also be configured to receive I2C frames via the non-I2C bus, and to send those I2C frames to the one or more I2C devices via the I2C bus. According to some embodiments, the non-I2C bus may include a commercial off-the-shelf (COTS) transceiver that receives the I2C frames from the network interoperability device and forwards those I2C frames over the non-I2C bus.

According to some embodiments, the non-I2C bus may idle in a default state that is a high voltage state. This may allow the non-I2C bus to interface with the I2C bus to which it is coupled via the network interoperability device, since both buses then idle in a high voltage state (which may be declared a logical "1" state, for example). The magnitude of the voltage level of the non-I2C bus in the high state may be the same, or different as, the magnitude of the voltage level of the I2C bus in its high state. According to some embodiments, the non-I2C bus may also be configured to transmit a low voltage state (which may be declared a logical "0", for example).

As used herein, the terms "high" and "low" voltage do not refer to any particular voltage magnitudes and/or signs, but are simply used as relative terms to denote differences in voltage between two different voltage states. For instance, a high voltage state of a system may be any voltage state that is of a higher voltage than a corresponding low voltage state of the system. A high voltage state and a low voltage state may have the same, or different signs. For example, and not so as to limit the possible voltage configurations, the following are illustrative high/low voltage state value pairs: 10V/0V, 5V/2.5V, 10V/−10V, −5V/−10V, 0V/−5V.

As discussed above, transmission of data along an I2C bus line is transmitted to all connected devices and the bus line idles in a high voltage state. The inventors have recognized that a network interoperability device as described above must ensure that low voltage signals received from the non-I2C bus are supplied to connected I2C devices, and similarly that low voltage signals transmitted from an I2C device are transmitted by the non-I2C bus. The network interoperability device could not simply set its state based on a signal received from either an I2C device or the non-I2C bus, otherwise an endless feedback loop could result wherein a low state is received by the network interoperability device from the non-I2C bus, which causes the I2C devices to which the network interoperability device is connected to be set to the low state, which causes the network interoperability device to set a low state, which causes the non-I2C bus to be set to the low state, which again causes the I2C devices to be set to the low state, etc.

For example, if an I2C device drives the voltage of a signal line low to transmit a low state (e.g., a digital "0"), the connected network interoperability device will measure a low voltage state on the signal line. However, in another case where an I2C device coupled to the network interoperability device across the non-I2C bus drives the voltage of a signal line low, the network interoperability device will also measure a low voltage state on that signal line. In the first case, the low voltage state is to be transmitted (and the network interoperability device should drive the non-I2C bus low) whereas in the second case the low voltage state is to be received (and the network interoperability device should drive the I2C device low). Accordingly, the network interoperability device may be configured to distinguish between a low voltage state being received from the non-I2C bus and a low voltage state being transmitted by an I2C device. According to some embodiments, a network interoperability device distinguishes between reception and transmission of a voltage state based on a direction of current flow detected by the network interoperability device.

Following below are more detailed descriptions of various concepts related to, and embodiments of, an I2C bus extender. It should be appreciated that various aspects described herein may be implemented in any of numerous ways. Example of specific implementations are therefore provided herein for illustrative purposes only. In addition, the various aspects described in the embodiments below may be used along or in any combination, and are not limited to the combinations explicitly described herein.

Figure 2:
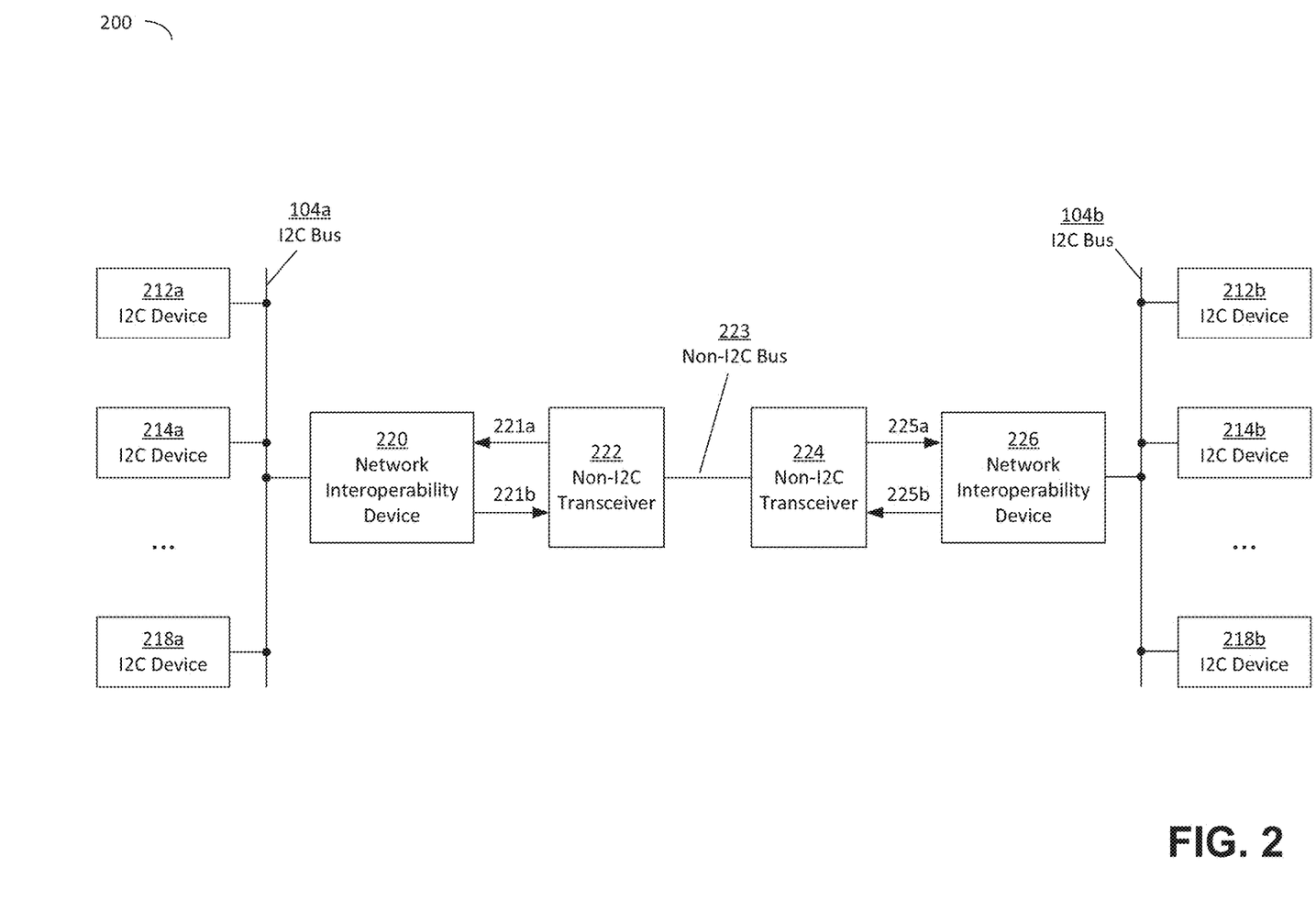
FIG. 2 depicts a block diagram of an illustrative system utilizing a network interoperability device, according to some embodiments.

FIG. 2 depicts a block diagram of an illustrative system utilizing a network interoperability device, according to some embodiments. System 200 depicts I2C devices 212a, 214a and 218a coupled to an I2C bus 104a. These devices may communicate with I2C devices 212b, 214b and 218b which are coupled to a second I2C bus 104*b*. As discussed above, use of a single I2C bus to facilitate communication between I2C devices, as depicted in FIG. 1, may result in noise and/or impedance issues within the I2C bus. Accordingly, a non-I2C bus 223 is supplied with associated non-I2C transceivers 222 and 224. To facilitate interoperability of the non-I2C bus 223 and the I2C buses 104*a* and 104*b*, network interoperability devices 220 and 226, respectively, are provided.

In the example of FIG. 2, network interoperability device 220 is coupled to non-I2C transceiver 222 via an outgoing signal line 221*b* and an incoming signal line 221*a*. Network interoperability device 220 may receive a signal on I2C bus 104*a* and as a result may produce an output via signal line 221*b*. Signals output from network interoperability device 220 via signal line 221*b* to the non-I2C transceiver 222 may be transmitted by non-I2C transceiver 222 along non-I2C bus 223. Signals transmitted to non-I2C bus 223 may be received by non-I2C transceiver 224 and supplied to network interoperability device 226 via signal line 225*a*. As a result, the network interoperability device 226 may produce a signal on I2C bus 104*b*.

Similarly, network interoperability device 226 may receive a signal on I2C bus 104*b* and as a result produce an output via signal line 225*b*. Signals output from network interoperability device 226 via signal line 225*b* to the non-I2C transceiver 224 may be transmitted by non-I2C transceiver 226 along non-I2C bus 223. Signals transmitted to non-I2C bus 223 may be received by non-I2C transceiver 222 and supplied to network interoperability device 220 via signal line 221*a*. As a result, the network interoperability device 220 may produce a signal on I2C bus 104*a*.

The line depicted as connecting I2C devices 212*a*, 214*a*, 218*a* and network interoperability device 220 together, and the line depicted as connecting I2C devices 212*b*, 214*b*, 218*b* and network interoperability device 226 together may represent an I2C data signal line, may represent an I2C clock signal line, or may represent both of an I2C data signal line and an I2C clock signal line. Accordingly, network interoperability devices 220 and 226 may send and receive data along an I2C data signal line, an I2C clock signal line, or both of an I2C data signal line and an I2C clock signal line. In some embodiments, therefore, an I2C device may be coupled to a first network interoperability device via the I2C device's data signal line and to a second network interoperability device via the I2C device's clock signal line. In some embodiments, an I2C device may be coupled to a single network interoperability device via the I2C device's data signal line and the I2C device's clock signal line. The connections 221*a*, 221*b*, 225*a*, 225*b* and 223 shown in FIG. 2 may represent a data signal line, a clock signal line or both of a data signal line and a clock signal line, the selection of which may depend on the type of non-I2C physical layer utilized as non-I2C bus 223.

As discussed above, a network interoperability device may be configured to distinguish between a low voltage state being received from a non-I2C bus and a low voltage state being transmitted by an I2C device. According to some embodiments, network interoperability devices 220 and 226 may be configured to measure or otherwise respond based on voltage states of signal lines to which they are connected, which in the example of FIG. 2 are I2C bus 104*a* and signal lines 221*a* and 221*b*.

According to some embodiments, non-I2C bus 223 may idle in a high voltage state. This may facilitate an effective interface with I2C bus 104*a* and/or I2C bus 104*b*, since an I2C bus similarly idles in a high voltage state. The magnitude of the voltage of the high voltage states of I2C bus 104, I2C bus 104 and non-I2C bus 223 may be the same, or may be different from one another. For example, I2C bus 104 may idle at a high voltage state of 5V whereas non-I2C bus 223 may idle at a high voltage state of 3.3V. According to some embodiments, a high voltage state of any of I2C bus 104, I2C bus 104 and non-I2C bus 223 may be between 1V and 5V, including between 1.5V and 1.8V for applications in mobile devices.

According to some embodiments, either or both of non-I2C transceivers 222 and 224 may be configured to transmit a low voltage signal via non-I2C bus 223. According to some embodiments, either or both of non-I2C transceivers 222 and 224 may be configured with an output enable feature to be controlled to transmit a low voltage signal. Whether non-I2C transceiver 222 and/or 224 are configured to transmit a low voltage signal or to have an output enable feature may be selected based on considerations of cost, device availability, etc. based on the I2C device function and its desired role in system 200. According to some embodiments, either or both of non-I2C transceivers 222 and 224 may be configured to support a multidrop configuration.

According to some embodiments, non-I2C bus 223 may be a controller area network (CAN) bus. A CAN bus may be suitable for use in system 200 due to it idling in a high voltage state (a digital "1", called "recessive" in CAN bus) and transmitting a low voltage state (a digital "0", called "dominant" in CAN bus). Where non-I2C bus 223 is a CAN bus, non-I2C transceivers 222 and 224 may accordingly be CAN bus transceivers. According to some embodiments, non-I2C bus 223 may be an RS-485 link. Where non-I2C bus 223 is an RS-485 link, non-I2C transceivers 222 and 224 may accordingly be RS-485 transceivers.

Any number and type of physical cables may be used to transmit signals along non-I2C bus 223. According to some embodiments, non-I2C transceivers 222 and 224 may send and receive signals (via non-I2C bus 223 and/or via lines 221, 221*b*, 225*a* and/or 225*b*) via differential signaling and/or via single-ended signaling. A differential pair may have an advantage in reducing common mode noise between the non-I2C transceivers. It will further be appreciated that, in general, any number of co-located I2C devices (such as I2C devices 212*a*, 214*a* and 218*a*, or I2C devices 212*b*, 214*b* and 218*b*) may share a single network interoperability device and that several co-located I2C devices are depicted in FIG. 2 simply as an illustrative embodiment.

According to some embodiments, the impedance of non-I2C transceiver 222 may be higher than that of any of I2C devices 212*a*, 214*a* and 218*a*. This may allow or improve the ability of network interoperability device 220 to identify a low voltage state from the I2C bus 104*a* and/or on signal lines 221*a* or 221*b*. Similarly, according to some embodiments, the impedance of non-I2C transceiver 224 may be higher than that of any of I2C devices 212*b*, 214*b* and 218*b*.

Figure 3A:
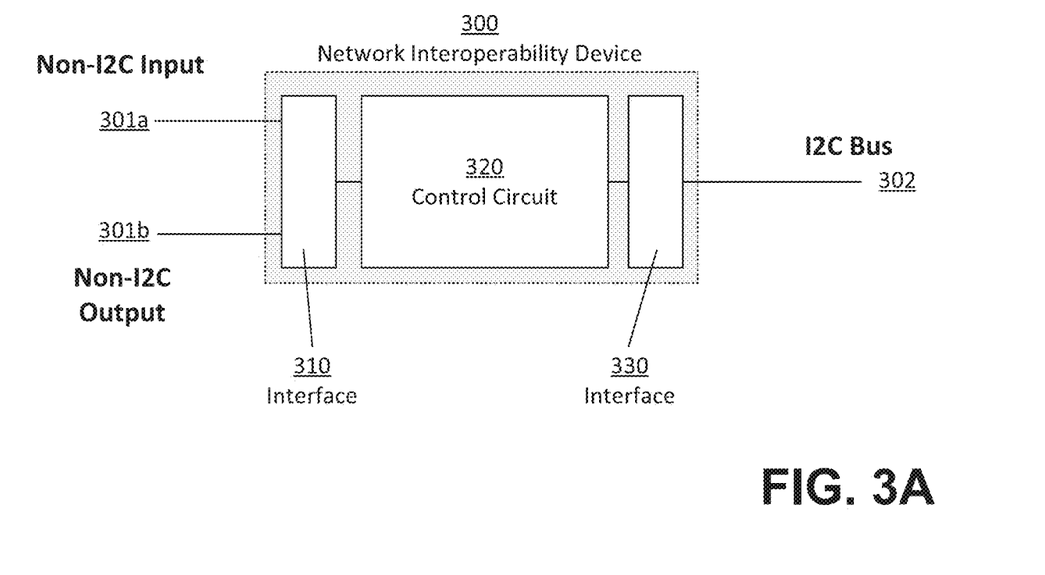
FIG. 3A depicts a block diagram of an illustrative network interoperability device, according to some embodiments.

FIG. 3A depicts a block diagram of an illustrative network interoperability device, according to some embodiments. Network interoperability device 300 includes a first interface 310 configured to communicate via non-I2C input 301*a* and non-I2C output 301*b*, and a second interface 330 configured to communicate with an I2C bus 302. Non-I2C input 301*a* and non-I2C output 301*b* may be coupled to a suitable non-I2C transceiver, which may transmit to and/or receive data from a non-I2C bus (not shown in FIG. 3A). Network interoperability device 300 may, for example, be used as network interoperability device 220 and/or network interoperability device 226 shown in the example of FIG. 2.

Figure 3B:
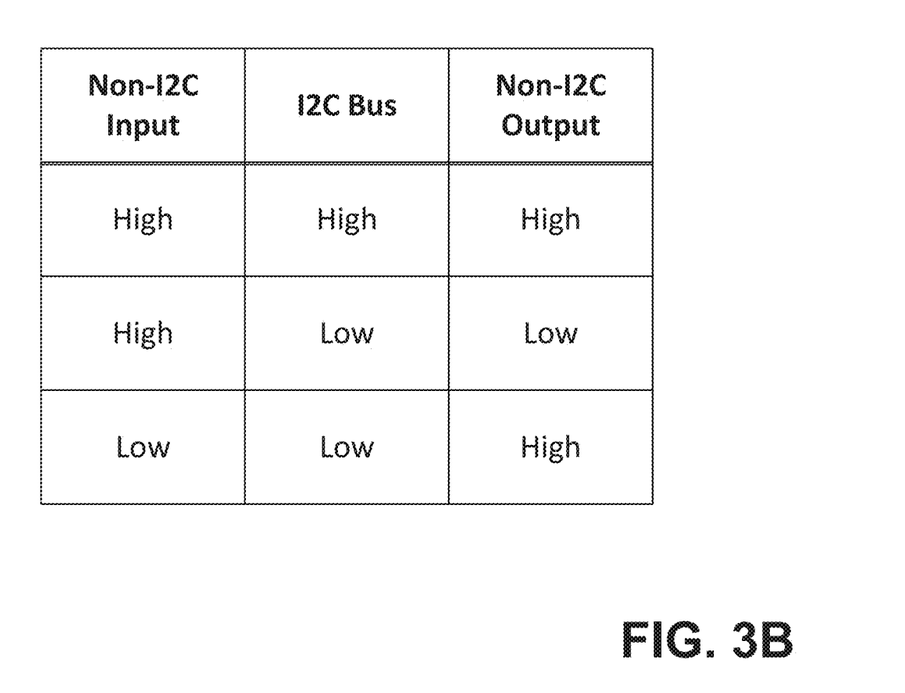
FIG. 3B is a table illustrating voltage states of a non-I2C input signal, a non-I2C output signal, and an I2C bus signal, according to some embodiments.

In the example of FIG. 3A, control circuit 320 is configured to set a high or low voltage state of non-I2C output 301b and/or I2C bus 302 based at least in part on a voltage state of non-I2C input 301a and/or a voltage state of I2C bus 302. According to some embodiments, control circuit 320 may be configured to set the high or low voltage state based on a measurement of a current direction. The desired voltage states of each of non-I2C input 301a, non-I2C output 301b and I2C bus 302 are depicted in FIG. 3B. As discussed above, if network interoperability device 300 were to simply match the voltage state of an input signal from non-I2C input 301a and of a signal from I2C bus 302, it would lead to an endless feedback loop in which the signal lines would always be set to a low voltage state. Accordingly, control circuit 320 is configured to produce the voltage state combinations shown in FIG. 3B based on detection of a voltage state of non-I2C input 301a and/or a voltage state of I2C bus 302.

As shown in FIG. 3B, when the non-I2C input has a high voltage state and the I2C bus also has a high voltage state, the non-I2C output is also set to have a high voltage state. This configuration corresponds to the idle state in which all I2C devices coupled to the I2C bus 302 are idle and transmitting a high state, and a non-I2C transceiver coupled to the non-I2C input 301a is also transmitting a high state.

When an I2C device coupled to the I2C bus 302 drives the I2C bus to a low voltage state, the non-I2C output 301b is also driven to the low state in order to transmit the low voltage signal across the non-I2C link. However, the non-I2C input remains in a high state. This state is shown in the third row of the table in FIG. 3B.

When a non-I2C transceiver to which the non-I2C input 301a is coupled produces a low voltage state, non-I2C input 301a will accordingly be in the low voltage state. In this case, shown in the fourth row of the table in FIG. 3B, the I2C bus should be driven to the low state to transmit this signal to any I2C devices coupled to the I2C bus. The non-I2C output should, however, remain in the high voltage state.

Any suitable circuit configured to respond to the voltages of the non-I2C input and I2C bus in this manner may be used as control circuit 320. According to some embodiments, one or more controllers, such as microprocessors, may be used within control circuit 320 to monitor voltage states and produce output accordingly. Alternatively, control circuit 320 may be composed of a small number of basic electronics components, such as resistors, capacitors, transistors and comparators.

Control circuit 320 may set voltages in the manner described above for each digital bit of an I2C frame (e.g., address frame and/or data frame). Accordingly, a digital I2C frame may be communicated from an I2C bus to a non-I2C transceiver and/or may be received from a non-I2C transceiver and communicated to an I2C bus.

While voltage states shown in FIG. 3B are simply labeled "high" or "low" it will be appreciated that the magnitude of all of the "high" voltages are not necessarily the same (though they may be), nor are the magnitudes of all of the "low" voltages necessarily the same (though they may be). The magnitudes may simply be sufficiently different from one another that devices coupled to I2C bus 302 are able to identify whether a low or a high voltage signal has been applied to the I2C bus. Similarly, the magnitudes may be sufficiently different such that a non-I2C transceiver coupled to non-I2C input 301a and non-I2C output 301b can identify whether a high or low voltage signal has been applied to each of signal lines 301a and 301b. According to some embodiments, a high voltage state for non-I2C input 301a and/or non-I2C output 301b is of a lower voltage than a high voltage state of I2C bus 302.

Figure 4:
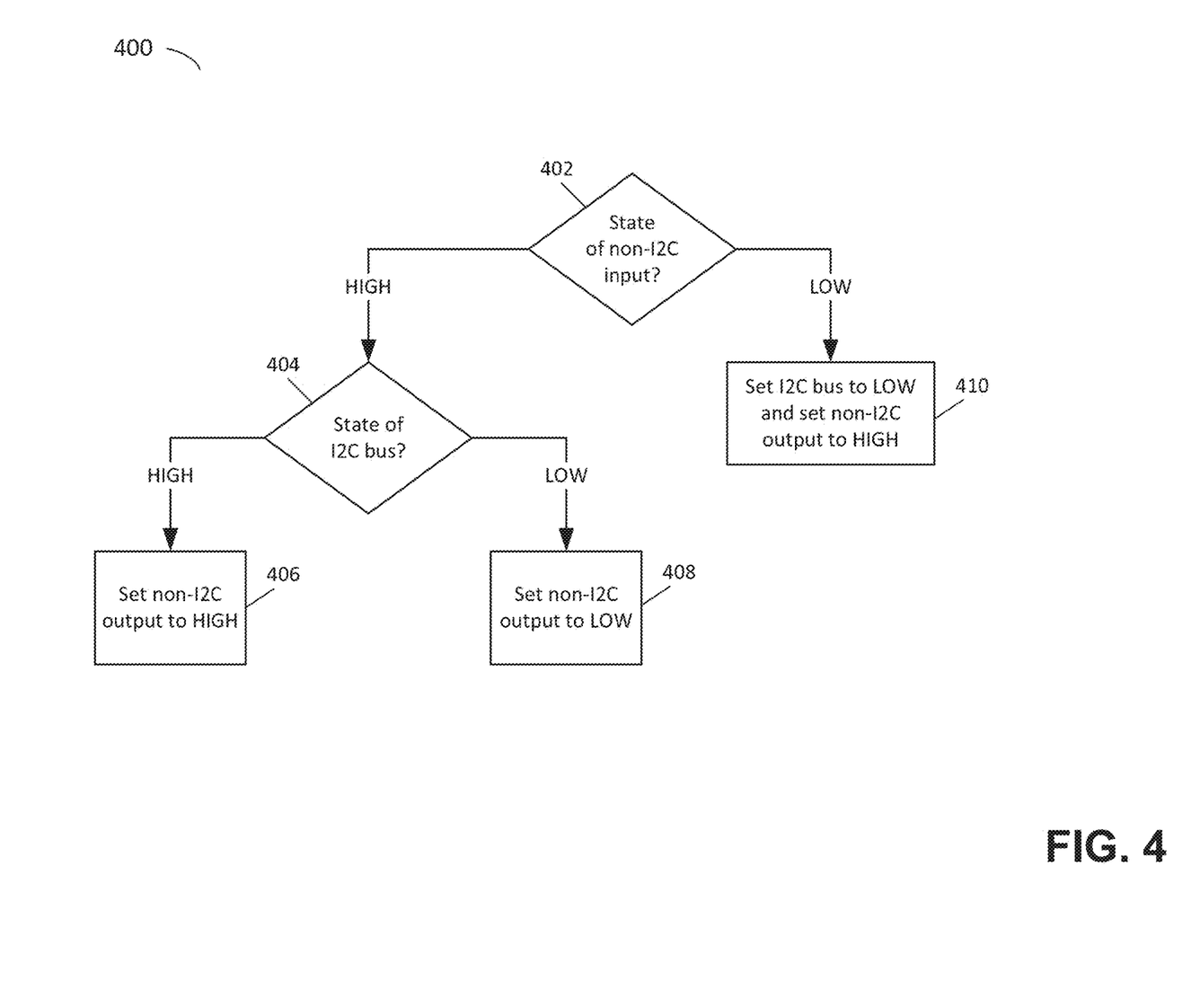
FIG. 4 is a flow chart illustrating decision logic of setting of an non-I2C output signal, according to some embodiments.

FIG. 4 is a flow chart illustrating decision logic of setting of an non-I2C output signal, according to some embodiments. The decision logic of FIG. 4 may be performed by control circuit 320 shown in FIG. 3A. The logic depicted in FIG. 4 produces the voltage combinations shown in FIG. 3B, though FIG. 4 illustrates the dependency of the different states.

Process 400 begins with act 402 in which the voltage state of the non-I2C input is determined. Said determination need not consist of an actual measurement of the voltage by a device (though it may), but may rather be determined by a portion of the control circuit producing a first signal when the voltage state of the non-I2C input is high and the same portion of the control circuit producing a second signal, different from the first signal, when the voltage state of the non-I2C input is low. Said difference in signals may constitute any difference in electrical activity that may be measured.

If, in act 402, the non-I2C input is determined to be a low voltage state, the network interoperability device drives the coupled I2C bus to the low state while maintaining the non-I2C output at a high voltage state. If, on the other hand, in act 402 the non-I2C input is determined to be a high voltage state, process 400 continues to act 404 in which the voltage state of the I2C bus is determined.

If, in act 404, the I2C bus is determined to be in a low voltage state, the network interoperability device drives the non-I2C output to the low state while maintaining the non-I2C input at a high voltage state. If instead the I2C bus is determined to be in a high voltage state, the network interoperability device drives the non-I2C output to the high state while maintaining the non-I2C input at a high voltage state.

It will be appreciated that process 400 may be performed by a network interoperability device as one or more methods of controlling communication of an I2C frame. According to some embodiments, a method is provided of electrically coupling one or more I2C devices via a non-I2C bus by controlling communication of an I2C frame using a network interoperability device comprising a first interface configured to electrically couple to the one or more I2C devices via an I2C bus, and a second interface configured to electrically couple to a data input port and a distinct data output port of a non-I2C transceiver. In some implementations, controlling the communication of an I2C frame between the I2C bus and the non-I2C transceiver comprises determining whether the non-I2C transceiver is transmitting an I2C frame to the I2C bus. In some implementations, controlling the communication of an I2C frame between the I2C bus and the non-I2C transceiver comprises sensing a direction of current by the network interoperability device.

Figure 5:
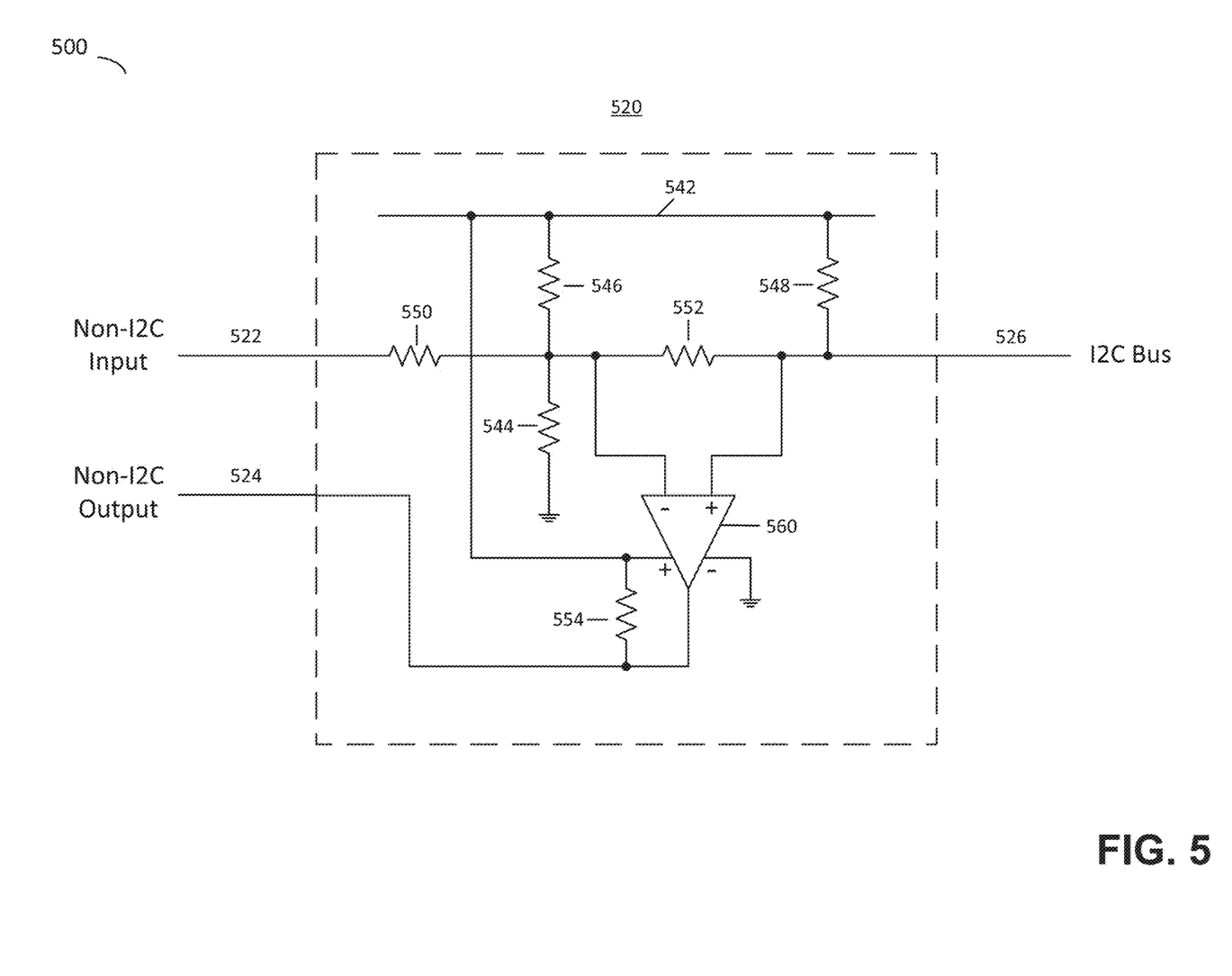
FIG. 5 is a circuit diagram of an illustrative network interoperability device, according to some embodiments.

FIG. 5 is a circuit diagram of an illustrative network interoperability device, according to some embodiments. In the example of FIG. 5, network interoperability device 520 is coupled to non-I2C input 522, non-I2C output 524 and I2C bus 526. Network interoperability device 520 may, for example, be used as network interoperability device 300 shown in FIG. 3A, network interoperability device 220 shown in FIG. 2 and/or network interoperability device 226 shown in FIG. 2.

Network interoperability device 520 is configured, via resistors 544, 546, 548, 550, 552, 554 and comparator 560 to produce voltages along signal lines 522, 524 and 526 consistent with those shown in FIG. 3B. Pull-down resistors 546 and 548 are coupled to power line 542, which may supply any suitable voltage, such as between 1V and 5V (e.g., 3.3V).

As discussed above in relation to FIG. 3A, in some embodiments a network interoperability device may be configured to set a high or low voltage state based on a measurement of a current direction. In the example of FIG. 5, comparator 560 and resistor 552 effectively perform detection of a current flow between non-I2C input 522 and I2C Bus 526, as described by the following paragraphs. Note that the function of the illustrative circuit depicted in FIG. 5 produces the desired combinations of non-I2C input and output and I2C bus state as shown in FIG. 3B and discussed above.

In a state in which the I2C bus and non-I2C bus are idle (and therefore in a high voltage state), current flows from the power supply 542 through resistors 548, 552 and 544 to ground. The positive input to comparator 560 is at a higher voltage than the negative input to the comparator (due to resistor 552), and the comparator outputs a high voltage to non-I2C output 524.

In a state in which the I2C bus has been driven to a low voltage state while the non-I2C input is high, the current flows through resistors 546 and 552 to the I2C bus. Consequently, the comparator 560 has a higher voltage at its negative input than at its positive input, and as a result produces a low voltage output to non-I2C output 524.

In a state in which the non-I2C input has a low voltage state and the I2C bus has a high voltage state, the current flows through resistors 548 and 552 to 550. This causes the I2C bus to have a lower voltage, which indicates that the I2C bus is receiving a "low" signal. The positive input to comparator 560 is at a higher voltage than the negative input to the comparator (due to resistor 552), and the comparator outputs a high voltage to non-I2C output 524.

According to some embodiments, comparator 560 may be a rail-rail comparator. Resistors 544, 546, 548, 550, 552 and 554 may have any suitable values such that the above behavior is produced. Illustrative and non-limiting values of the resistances of these resistors are resistor 544=5 kΩ; resistor 546=10 kΩ; resistor 548=10 kΩ; resistor 550=100Ω; resistor 552=100Ω; and resistor 554=1 kΩ.

The example of network interoperability device 520 shown in FIG. 5 therefore provides a circuit that allows communication of I2C frames from an I2C bus to a non-I2C bus, and vice versa. Since illustrative network interoperability device 520 utilizes a small number of simple electronics components, it may be produced as a very lightweight circuit and accordingly may be particularly suitable for applications such as UAVs or other applications in which weight and/or size constraints exist. It will be appreciated, however, that the illustrative network interoperability device shown in FIG. 5 is only provided as one possible way to configure a circuit to produce voltages consistent with those shown in FIG. 3B. For example, simple modifications such as replacing resistor 552 in FIG. 5 with a diode may provide also the desired functionality.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Various inventive concepts may be embodied as one or more methods, of which examples have been provided. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A network interoperability device, comprising:
   a first interface configured to electrically couple to one or more inter-integrated circuit (I2C) devices via an I2C bus;
   a second interface having an input configured to electrically couple to and receive data from a non-I2C transceiver and having a distinct output configured to electrically couple to and transmit data to the non-I2C transceiver; and
   a control circuit electrically coupled to the first and second interfaces and configured to control communication of an I2C frame between the I2C bus and the non-I2C transceiver by controlling a voltage of the output of the second interface based on a direction of current flow through at least one component of the control circuit, wherein:
      when a voltage state of the input of the second interface is a low voltage state, the current flow through the at least one component of the control circuit is in a first direction;
      when the voltage state of the input of the second interface is a high voltage state and a voltage state of the first interface is a low voltage state, the current flow through the at least one component of the control circuit is in the first direction; and
      when the voltage state of the input of the second interface is a high voltage state and the voltage state of the first interface is a high voltage state, the current flow through the at least one component of the control circuit is in a second direction, opposite to the first direction.

2. The network interoperability device of claim 1, wherein controlling the communication of an I2C frame between the I2C bus and the non-I2C transceiver comprises determining whether the non-I2C transceiver is transmitting an I2C frame to the I2C bus.

3. The network interoperability device of claim 2, wherein controlling the communication of an I2C frame between the I2C bus and the non-I2C transceiver further comprises:
   in response to determining that the non-I2C transceiver is transmitting an I2C frame to the I2C bus, sending the transmitted I2C frame to the I2C bus via the first interface, and controlling the output of the second interface to transmit an idle signal to the non-I2C transceiver.

4. The network interoperability device of claim 2, wherein controlling the communication of an I2C frame between the I2C bus and the non-I2C transceiver further comprises determining whether the I2C bus is transmitting an I2C frame to the non-I2C transceiver.

5. The network interoperability device of claim 4, wherein controlling the communication of an I2C frame between the I2C bus and the non-I2C transceiver further comprises:
   in response to determining that the I2C bus is transmitting an I2C frame to the non-I2C transceiver, sending the transmitted I2C frame to the non-I2C transceiver via the second interface.

6. The network interoperability device of claim 1, wherein controlling communication of an I2C frame between the I2C bus and the non-I2C transceiver comprises receiving the I2C frame from the I2C bus via the first interface and controlling the non-I2C transceiver, via the second interface, to transmit the I2C frame.

7. The network interoperability device of claim 6, wherein controlling the non-I2C transceiver to transmit the I2C frame comprises:
   for each bit of the I2C frame, determining whether a signal in the control circuit has a first polarity corresponding to a first bit value or a second polarity corresponding to a second bit value;
   in response to determining that the signal has the first polarity, controlling the non-I2C transceiver to transmit the first bit value via a transmission interface of the non-I2C transceiver; and
   in response to determining that the signal has the second polarity, controlling the non-I2C transceiver to transmit the second bit value via the transmission interface of the non-I2C transceiver.

8. The network interoperability device of claim 7, wherein determining that the signal has the first polarity comprises determining that the direction of current flow is in a first direction, and wherein determining that the signal has the second polarity comprises determining that the direction of current flow is in a second direction.

9. The network interoperability device of claim 8, wherein determining that the current flows in the first direction comprises determining that the current flows toward the I2C bus.

10. The network interoperability device of claim 8, wherein determining that the current flows in the second direction comprises determining that the current flows toward the non-I2C transceiver.

11. The network interoperability device of claim 1, wherein controlling communication of an I2C frame between the I2C bus and the non-I2C transceiver comprises receiving the I2C frame from the non-I2C transceiver via the second interface and controlling the first interface to send the I2C frame to the I2C bus.

12. The network interoperability device of claim 11, wherein the control circuit is further configured to control the output of the second interface, while the control circuit receives the second I2C frame via the input of the second interface, to transmit an idle signal.

13. The network interoperability device of claim 11, wherein controlling the first interface to transmit the I2C frame to the I2C bus comprises:
   for each bit of the I2C frame having a first bit value, setting a voltage at the first interface to a first voltage value below a first voltage threshold; and
   for each bit of the I2C frame having a second bit value, setting the voltage at the first interface to a second voltage value above a second voltage threshold.

14. A communication network, comprising:
   one or more inter-integrated circuit (I2C) devices;
   an I2C bus coupling the one or more I2C devices;
   a non-I2C transceiver; and
   a network interoperability device, including:
      a first interface electrically coupled to the I2C bus;
      a second interface electrically coupled to the non-I2C transceiver via an input and an output of the second interface; and
      a control circuit electrically coupled to the first and second interfaces and configured to control communication of an I2C frame between the I2C bus and the non-I2C transceiver by controlling a voltage of the output of the second interface based on a direction of current flow through at least one component of the control circuit, wherein:
         when a voltage state of the input of the second interface is a low voltage state, the current flow through the at least one component of the control circuit is in a first direction;
         when the voltage state of the input of the second interface is a high voltage state and a voltage state of the first interface is a low voltage state, the current flow through the at least one component of the control circuit is in the first direction; and
         when the voltage state of the input of the second interface is a high voltage state and the voltage state of the first interface is a high voltage state, the current flow through the at least one component of the control circuit is in a second direction, opposite to the first direction.

15. The network interoperability device of claim 1, wherein the voltage of the output of the second interface is set to a first value by the control circuit when the direction of the current flow through the at least one component is in a first direction, and is set to a second value by the control circuit when the direction of the current flow through the at least one component is in a second direction.

16. The network interoperability device of claim 1, wherein the at least one component of the control circuit includes a resistor.

* * * * *